United States Patent
Hoikka

(10) Patent No.: US 9,740,481 B2
(45) Date of Patent: Aug. 22, 2017

(54) ELECTRONIC DEVICE AND METHOD FOR MEMORY ALLOCATION IN ELECTRONIC DEVICE

(71) Applicant: Samsung Electronics Co., Ltd., Gyeonggi-do (KR)

(72) Inventor: Kimmo Hoikka, Middlesex (GB)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 99 days.

(21) Appl. No.: 14/559,469

(22) Filed: Dec. 3, 2014

(65) Prior Publication Data

US 2015/0153958 A1 Jun. 4, 2015

(30) Foreign Application Priority Data

Dec. 3, 2013 (GB) .................. 1321308.7
Jul. 21, 2014 (KR) ........... 10-2014-0091728

(51) Int. Cl.
*G06F 12/00* (2006.01)
*G06F 13/00* (2006.01)
*G06F 13/28* (2006.01)
*G06F 9/00* (2006.01)
*G06F 12/02* (2006.01)

(52) U.S. Cl.
CPC .............. *G06F 9/00* (2013.01); *G06F 12/023* (2013.01); *G06F 2212/1044* (2013.01)

(58) Field of Classification Search
CPC ..... G06F 9/00; G06F 9/04; G06F 9/06; G06F 9/50; G06F 9/5005; G06F 9/5011; G06F 9/5016; G06F 9/5022; G06F 12/0223; G06F 12/023; G06F 12/0238; G06F 12/0246; G06F 12/0253; G06F 12/0284; G06F 12/0292; G06F 15/0275; G06F 15/0283; G06F 15/18; G06F 2212/00; G06F 2212/10; G06F 2212/1016; G06F 2212/1021; G06F 2212/1024; G06F 2212/1041; G06F 2212/1044; G06N 3/08; G06N 5/00;

(Continued)

(56) References Cited

U.S. PATENT DOCUMENTS 6,131,190 A 10/2000 Sidwell
6,230,247 B1 5/2001 Cannon et al.
(Continued)

FOREIGN PATENT DOCUMENTS

GB 2421096 A 6/2006
JP 2010239354 A 10/2010
WO WO 2011/059837 A1 5/2011

OTHER PUBLICATIONS

PSECMAC: A Novel Self-Organizing Multiresolution Associative Memory Architecture; Teddy et al; IEEE Transactions on Neural Networks, vol. 19, iss. 4; Apr. 2008; pp. 689-712 (24 pages).*
(Continued)

*Primary Examiner* — Daniel C Chappell

(57) ABSTRACT

An electronic device and a method of allocating a memory in an electronic device according to various embodiments of the present disclosure may identify a memory allocation request for an application, examine a history for the application through the identified request, and determine a memory allocation mode for the application, based on the result of the check. In addition, various embodiments may be possible.

20 Claims, 10 Drawing Sheets

(58) Field of Classification Search
CPC .......... G06N 5/003; G06N 5/02; G06N 5/022; G06N 5/025
See application file for complete search history.

(56) References Cited

U.S. PATENT DOCUMENTS

| | | | |
|---|---|---|---|
| 2006/0080350 A1 | 4/2006 | Mark | |
| 2007/0294691 A1* | 12/2007 | Park | G06F 9/445 718/100 |
| 2008/0082780 A1* | 4/2008 | Tsuji | G06F 12/0653 711/171 |
| 2010/0042801 A1* | 2/2010 | Lee | G06F 9/5016 711/171 |
| 2010/0228898 A1* | 9/2010 | Aranguren | G06F 3/061 710/56 |
| 2013/0132650 A1* | 5/2013 | Choi | G06F 12/02 711/103 |
| 2013/0173509 A1* | 7/2013 | Bjork | G06N 99/005 706/12 |
| 2013/0185487 A1* | 7/2013 | Kim | G06F 3/0605 711/103 |
| 2014/0019708 A1* | 1/2014 | Erdmann | G06F 12/0284 711/172 |

OTHER PUBLICATIONS

Autonomic Characterization of Workloads Using Workload Fingerprinting; Khanna et al; 2014 IEEE International Conference on Cloud Computing in Emerging Markets; Oct. 15-17, 2014 (8 pages).*

Proactive Workload Management in Hybrid Cloud Computing; Zhang et al; IEEE Transactions on Network and Service Management, col. 11, iss. 1; Mar. 2014; pp. 90-100 (11 pages).*

Combined Search Report and Examination Report Under Sections 17 & 18(3) in connection with United Kingdom Patent Application No. GB1321308.7; 9 pages.

* cited by examiner

ELECTRONIC DEVICE AND METHOD FOR MEMORY ALLOCATION IN ELECTRONIC DEVICE

CROSS-REFERENCE TO RELATED APPLICATION AND CLAIM OF PRIORITY

The present application is related to and claims the priority under 35 U.S.C. §119(a) to UK application Serial No. GB 1321308.7, which was filed in the UKIPO on Dec. 3, 2013, and to Korean Application Serial No. 10-2014-0091728, which was filed in the Korean Intellectual Property Office on Jul. 21, 2014, the entire content of which are hereby incorporated by reference.

TECHNICAL FIELD

Various embodiments of the present disclosure relate to an electronic device and a method of allocating a memory in an electronic device.

BACKGROUND

In general, mobile electronic devices do not have the same processing power and memory resources as desktop computers in order to improve portability, and may rely on battery power to operate. For example, when a memory allocation is not good, it may have a bad effect on an operation of an electronic device, according to a driving time of applications. In addition, a battery lifetime may be shortened or excessive power consumption may be caused.

SUMMARY

In a method of allocating a memory, allocating a memory in a scheme supporting an effective throughput of data and a high application of available memory resource is required. When the memory allocation is performed, an application program may require larger or smaller memory allocations than those at the time when the initial allocations are performed initially, depending on a user or other inputs which are not known at the time when the initial allocations are performed.

When a plurality of application programs share a memory space or when actual memory allocations requested by an application program are affected by UI toolkits or a middleware such as other application program interface functions or routines, an effective memory allocation may be difficult. Also, re-allocating a memory or allocating all memory with a predetermined allocation mode may incur an overhead when a corresponding application is executed.

In addition, in a case of an excessive allocation of a memory, memory may become wasted due to further allocating a memory which may not be used. When a memory is initially allocated, an execution time may be required in the memory allocation. At this time, the larger the allocated memory is, the larger the power consumption may be.

For example, when memory resources are shared in a computer system, a memory allocation may be exceeded by a plurality of application programs executed in the computer system. An available memory may be reduced according to the excessive memory allocation. Furthermore, an overhead may occur in a corresponding memory due to the excessive allocation.

For example, an electronic device and a method of allocating a memory in an electronic device may determine a memory allocation mode according to whether a history of an application is checked.

A memory allocation operation may be performed by using a history of an application or previous instances, according to the determined memory allocation mode.

An electronic device includes a memory configured to store memory allocation requests for each application, a processor configured to receive and identify a memory allocation request for an application, examine a history of the memory allocation requests for the application, determines a memory allocation mode for the application, based on the result of the examination, and perform a memory allocation operation according to the determined memory allocation mode.

In some embodiments, the processor is configured to select a learning mode as the memory allocation mode, based on the result of the examination.

In some embodiments, the processor is configured to shift the memory allocation mode as a non-learning mode, when the history meets a learning threshold that includes at least one of a number of memory allocation request during a predetermined time, a number of previous instance of the application, and an elapsed time after a first inquiry requesting a history of the memory allocation request.

In some embodiments, the processor is configured to shift the memory allocation mode from the non-learning mode to the learning mode, when the history meets a re-learning threshold that includes at least one of the number of a memory re-allocation request during a predetermined time and a size value of a combination of a re-allocated memory.

In some embodiments, the processor is configured to determine whether the memory allocation request of the application requests a fixed size of allocation from a pool of a memory reserved in advance, when a previously allocated memory is a static type container, from current or previous instances of the application.

In some embodiments, the processor is configured to record the history for the memory allocation request performed by a plurality of instances of the application during an operation of the learning mode in the memory.

To address the above-discussed deficiencies, it is a primary object that an electronic device according to an aspect of the present disclosure may include a memory allocating unit that identifies a memory allocation request for an application of a processor, checks a history for the application through the identified request, and determines a memory allocation mode for the application, based on the result of the check, and a processor that controls to perform a memory allocation operation according to the determined memory allocation mode.

In addition, a method of allocating a memory in an electronic device according to an aspect of the present disclosure may include identifying a memory allocation request for an application, checking a history for the application through the identified request, determining a memory allocation mode for the application, based on the result of the check, and performing a memory allocation according to the determined memory allocation mode.

According to various aspects of the present disclosure, allocating a memory in a fixed mode regardless of a history of the memory can be prevented.

Therefore, consumption of a memory owing to an excessive or a minimum allocation of the memory can be prevented, and a memory allocation operation unnecessarily performed can be decreased, and thus an overhead of an electronic device can be decreased.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
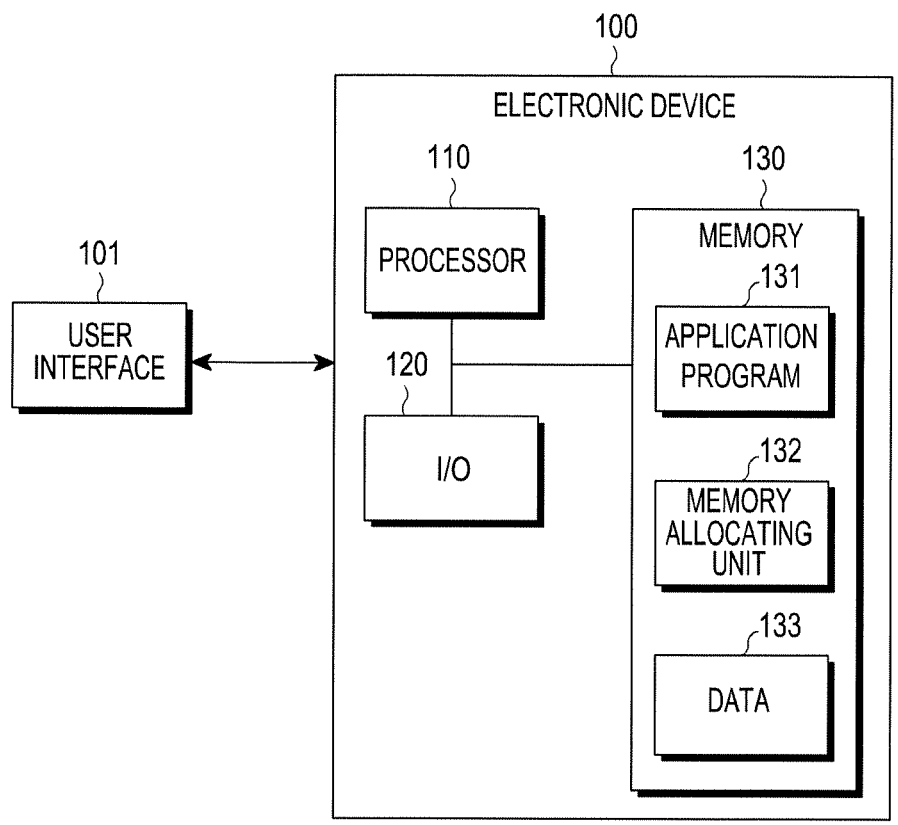
FIG. 1 is a block diagram illustrating an example of a configuration of an electronic device to which various embodiments of the present disclosure may be applied.

FIGS. 1 through 11, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic devices. Hereinafter, various embodiments of the present disclosure will be described in conjunction with the accompanying drawings. The present disclosure may have various embodiments, while modifications and changes may be made therein. Therefore, the present disclosure will be described in conjunction with particular embodiments shown in the accompanying drawings. However, it should be understood that there is no intent to limit the present disclosure to the particular forms disclosed herein; rather, the present disclosure should be construed to cover all modifications, equivalents, and/or alternatives falling within the spirit and scope of the disclosure. In the description of the drawings, identical or similar reference numerals are used to designate identical or similar elements.

As used herein, the expression "include" or "may include" refers to the existence of a corresponding function, operation, or element, and does not exclude one or more additional functions, operations, or elements. Also, as used herein, the terms "include" and/or "have" should be construed to denote a certain feature, number, step, operation, element, component or a combination thereof, and should not be construed to exclude the existence or possible addition of one or more other features, numbers, steps, operations, elements, components, or combinations thereof.

Also, as used here, the expression "or" includes any or all combinations of words enumerated together. For example, the expression "A or B" may include A, may include B, or may include both A and B.

In the present disclosure, the expressions "a first", "a second", "the first", "the second", and the like may modify various elements, but the corresponding elements are not limited by these expressions. For example, the above expressions do not limit the sequence and/or importance of the corresponding elements. The above expressions may be used merely for the purpose of distinguishing one element from the other elements. For example, although both a first user device and a second user device are user devices, they indicate different user devices. For example, a first element may be termed a second element, and similarly, a second element may be termed a first element without departing from the scope of the present disclosure.

When an element is referred to as being "coupled" or "connected" to any other element, it should be understood that not only the element may be directly coupled or connected to the other element, but also a third element may be interposed therebetween. Contrarily, when an element is referred to as being "directly coupled" or "directly connected" to any other element, it should be understood that no element is interposed therebetween.

The terms used herein are used only to describe particular embodiments, and are not intended to limit the present disclosure. As used herein, the singular forms may include the plural forms as well, unless the context clearly indicates otherwise.

Unless defined otherwise, all terms used herein, including technical and scientific terms, have the same meaning as those commonly understood by a person of ordinary skill in the art to which the present disclosure pertains. Such terms as those defined in a generally used dictionary are to be interpreted to have the meaning equal to the contextual meaning in the relevant field of art, and are not to be interpreted to have ideal or excessively formal meaning unless clearly defined in the present disclosure.

An electronic device according to various embodiments of the present disclosure may be a device including a memory. The electronic device, for example, may include at least one of a smart phone, a tablet personal computer (PC), a mobile phone, a video phone, an e-book reader, a desktop PC, a laptop PC, a netbook computer, a personal digital assistant (PDA), a portable multimedia player (PMP), an MP3 player, a mobile medical device, a camera, and a wearable device (e.g., a head-mounted-device (HMD) such as electronic glasses, electronic clothes, an electronic bracelet, an electronic necklace, an electronic accessory, an electronic tattoo, or a smartwatch).

According to some embodiments, the electronic device may be a smart home appliance including a memory. The smart home appliance, for example, may include at least one of a television, a digital video disk (DVD) player, an audio player, a refrigerator, an air conditioners, a cleaner, an oven, a microwave oven, a washing machine, an air purifier, a set-top box, a TV box, a game console, an electronic dictionary, an electronic key, a camcorder, and an electronic frame.

According to some embodiments, the electronic device may include at least one of various medical appliances (e.g., magnetic resonance angiography (MRA), magnetic resonance imaging (MRI), computed tomography (CT), and ultrasonic machines), navigation equipment, a global positioning system (GPS) receiver, an event data recorder (EDR), a flight data recorder (FDR), an in-vehicle infotainment device, electronic equipment for ships (e.g., ship navigation equipment and a gyrocompass), avionics, security equipment, a vehicle head unit, an industrial or home robot, an automatic teller machine (ATM) of a banking system, and a point of sales (POS) of a store.

According to some embodiments, the electronic device may include at least one of a part of furniture or a building/structure having a communication function, an electronic board, an electronic signature-receiving device, a projector, and various kinds of measuring instruments (e.g., a water meter, an electric meter, a gas meter, and an electromagnetic wave meter). The electronic device according to various embodiments of the present disclosure may be a combination of one or more of the above-mentioned various devices. Also, the entity according to the present disclosure may be a flexible device. Further, it will be apparent to those skilled in the art that the entity according to the present disclosure is not limited to the above-mentioned devices.

According to various embodiments of the present disclosure, a computer-readable storage medium is provided having recorded thereon instructions which, when implemented by a computer system, cause the computer system to be arranged as set forth herein and/or which cause the computer system to perform any of the methods as set forth herein. The computer-readable storage medium may for example comprise a tangible and/or non-transient medium.

The terms "application" and "application program" are to be interpreted to mean not only programs which directly serve a user's need, but also components that are usable in the execution of applications, for example, middleware, UI tool kit code, etc. which are employed in ways that require memory allocations to be made as described herein. However, it will be appreciated that in terms of transparency for developers the concepts herein may be particularly useful when applied at the application level so that efficient memory allocation can be achieved for an application with a degree of transparency, as the user interacts with the application. At least some of embodiments described herein may be constructed, partially or wholly, using dedicated special-purpose hardware. Terms such as 'component', 'module' or 'unit' used herein may include, but are not limited to, a hardware device, such as circuitry in the form of discrete or integrated components, a Field Programmable Gate Array (FPGA) or Application Specific Integrated Circuit (ASIC), which performs certain tasks or provides the associated functionality.

In various embodiments of the present disclosure, the described elements may be configured to reside on a tangible, persistent, addressable storage medium and may be configured to execute on one or more processors. These functional elements may in some embodiments include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. Although the example embodiments have been described with reference to the components, modules and units discussed herein, such functional elements may be combined into fewer elements or separated into additional elements. Various combinations of optional features have been described herein, and it will be appreciated that described features may be combined in any suitable combination. In particular, the features of any one example embodiment may be combined with features of any other embodiment, as appropriate, except where such combinations are mutually exclusive. Throughout this specification, the term "comprising" or "comprises" means including the component(s) specified but not to the exclusion of the presence of others.

Hereinafter, an electronic device according to various embodiments of the present disclosure will be discussed with reference to the accompanying drawings. As used in various embodiments, the term "user" may indicate a person using an electronic device or a device (e.g. an artificial intelligence electronic device) using an electronic device.

Embodiments of the present disclosure may be operated when an application program is executed for an allocation of a memory. For example, in a computer system where actual memory resources of an application program are shared with another application program requesting an allocation of a memory, a memory use is allocated owing to other reasons such as minimizing power consumption and the like or an application program may be executed in computer systems where an excessive memory allocation and a re-allocation affecting a system performance are prevented. Embodiments of the present disclosure find a use of an application program when the application program is executed, but are not limited thereto.

FIG. 1 is a block diagram illustrating an example of a schematic electronic device configuration to which various embodiments of the present disclosure can be applied. Referring to FIG. 1, an electronic device 100 can include a processor 110, an input/output hardware (i.e. an input/output unit, hereinafter, referred to as I/O) 120 and a memory 130. For example, a method of allocating a memory according to an embodiment of the present disclosure can be implemented in a predetermined electronic device. The electronic device 100 described with reference to FIG. 1 is merely an example, and a person skilled in the art will realize and understand that the electronic device 100 is provided to aid in understanding for the purpose of completeness.

The processor 110 can control overall operations of the electronic device 100.

The I/O 120 can provide an interface between a user interface 101 and the electronic device 100.

The memory 130 can store data 133 and an application program 131. According to various embodiments of the present disclosure, the memory 130 can include a memory allocating unit 132.

According to various embodiments of the present disclosure, the electronic device 100 can include application programming interface functions, routines facilitating an access for an operating system, or hardware architecture features outputting information related to a memory allocation.

Hereinafter, the memory allocating unit according to an embodiment of the present disclosure will be described specifically with reference to FIG. 2.

Figure 2:
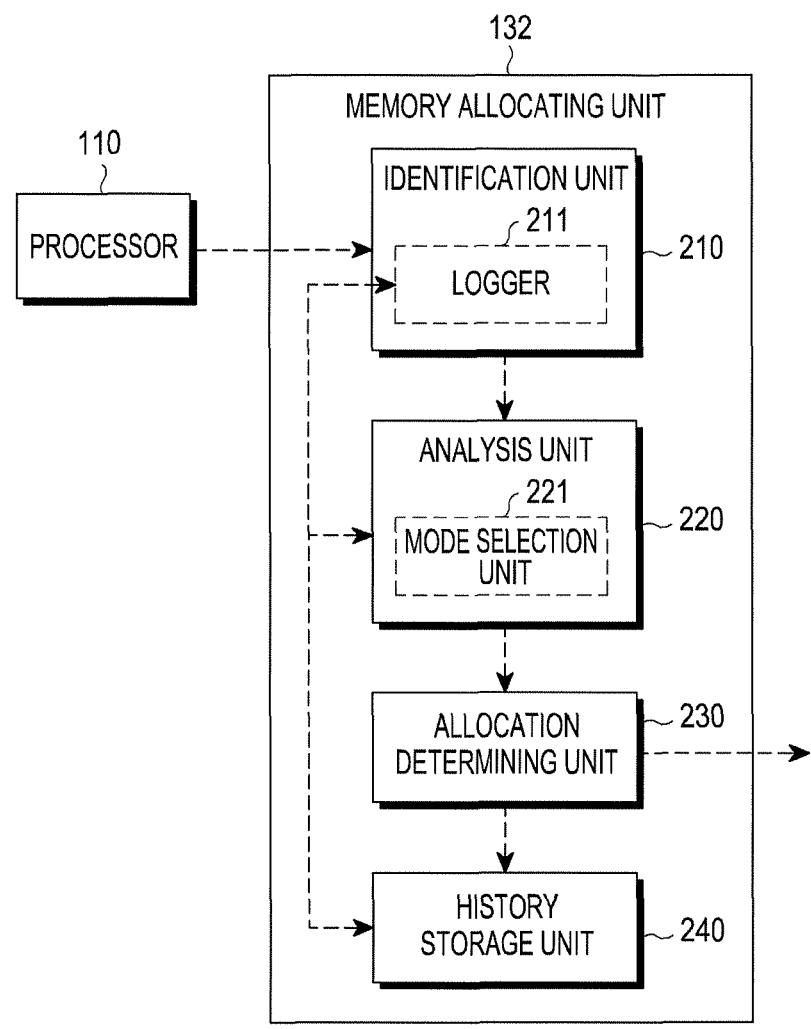
FIG. 2 is a block diagram illustrating an example of a configuration of a memory allocating unit to which various embodiments of the present disclosure may be applied.

FIG. 2 is a block diagram illustrating an example of a configuration of the memory allocating unit to which various embodiments of the present disclosure can be applied. Referring to FIG. 2, the memory allocating unit 131 can include an identification unit 210, an analysis unit 220, and an allocation determining unit 230, and can further include a history storage unit 240.

Referring to FIG. 2, it is illustrated that a processor 110 is outside of the memory allocating unit 132, but the processor 110 can be included in the memory allocating unit, and control to operate each configuration of the memory allocating unit 132.

The identification unit 210 can include a logger 211. The identification unit can identify a memory allocation request for a specific application. The identification unit 210 can identify a location of a container to which the memory allocation is requested, by using call stack information included in the memory allocation request, a comparative code position, or other means available in the electronic device 100. For example, the logger 211 can be present between instances of the application executed in the electronic device 100, and thus control to store the memory allocation requests for the application to the history storage unit 240. The stored memory allocation requests can include data for initial allocations performed on a specific container or re-allocations for previously allocated containers.

The analysis unit 220 can include a mode selection unit 221. The analysis unit 220 can identify the memory allocation request through the identification unit 210 and request a history of the corresponding application to the history storage unit 240. The analysis unit 220 can check the history of the application and analyze the identified request. Here, the history can be information on previous instances of the application requesting the memory allocation, or the container to which the memory is previously allocated.

When the previous instance of the application requesting the memory allocation is not checked as the result of the check of the history, the analysis unit 220 can determine that the application has not been executed previously in the electronic device 100. In this case, the analysis unit 220 can determine that there is no available information (e.g., a previous instance) in response to the memory allocation request. At this time, the mode selection unit 221 can select a non-learning mode as a memory allocation mode for the application.

In contrast, when the previous instance of the application requesting the memory allocation is checked as the result of the request from the analysis unit 220 to the history storage unit 240, it can be determined that the application has been executed previously in the electronic device 100. In this case, the analysis unit 220 can check available information in response to the memory allocation request. At this time, the mode selection unit 221 can select a learning mode as the memory allocation mode for the application.

For example, according to various embodiments of the present disclosure, the analysis unit 220 including the mode selection unit 221 can select one of the learning mode and the non-learning mode as the memory allocation mode for the application.

The allocation determining unit 230 can perform an allocation operation in response to the memory allocation request, according to the selected memory allocation mode. When the memory allocation mode is selected as the learning mode, the allocation determining unit 230 can perform the memory allocation operation for the application according to the history of the application.

For example, the history of an available application in the learning mode can be locally stored, and include data related to memory allocations made by a user of the electronic device 100. The data storage unit 240 according to various embodiments of the present disclosure can be included a flash memory, a disk, an SD card or another permanent memory available in the memory allocating unit 132. In addition, the history storage unit 240 can include a command file usable by a plurality of users.

Referring to FIG. 2, it is illustrated that the history storage unit 240 is included in the memory allocating unit 132, but the history storage unit 240 according to various embodiments of the present disclosure can be disposed outside of the memory allocating unit 132 to store. For example, the remotely storing history storage unit 240 can be accessed through a data communication, such as a wired or wireless communication system. In addition, the history storage unit 240 can be a type of a typical history average or an aggregate picture of a specific application shared between users. The electronic device 100 can examine data related to a history of an application executed by other people or an electronic device identical or similar to the electronic device 100, through data included in the history storage unit 240.

In addition, the history storage unit 240 can store a container identification database. The container identification database can include a log of allocated containers, link information linking the containers to the identified memory allocation requests, and information on the sizes of the allocated containers. In addition, the container information database can further include information on whether a corresponding container has been allocated as a static container from a reserved memory pool, info nation on whether the size of the container is changed after an initial allocation, and information related to a history of re-allocations for a container of which the size is changed, with respect to the static containers having a fixed size.

When the analysis unit 220 is requested to classify a specific container, the analysis unit 220 can check attributes of the corresponding container and classify the corresponding container as the static container or the non-static container. Here, the attributes of the container can be the size of the container or the number of the re-allocation. For example, when the size of the specific container is smaller than a predetermined size, or the specific container is not re-allocated after the initial allocation, the container can be classified as the static container. Meanwhile, when the size of the specific container is larger than the predetermined size, or the specific container is re-allocated frequently compared with a predetermined number, the container can be classified as the non-static container.

The analysis unit 220 can transfer the attributes for the container classified as the static container to the allocation determining unit 230. For example, when the memory 130 is a successive memory including a designated pool or a plurality of pools, the allocation determining unit 230 can determine that the container classified as the static container is allocated as a fixed size of part in the successive memory.

The analysis unit 220 can identify data for the non-static containers and store the identified data in the history storage unit 240. The previously stored history can be an instance of the application requesting the memory allocation. Therefore, the analysis unit 220 can detect which containers are mainly re-allocated.

In some embodiments, the elements and functions of the memory allocation unit can be implemented, in part or in whole, in one or more processor. For example, the identification unit, the analysis unit and the allocation determination unit can be incorporated into the processor 110.

For example, the method of allocating the memory according to various embodiments of the present disclosure allocates the memory in consideration of a previous instance or the number of the re-allocation, thereby reducing an unnecessary re-allocation for the specific application.

Figure 3:
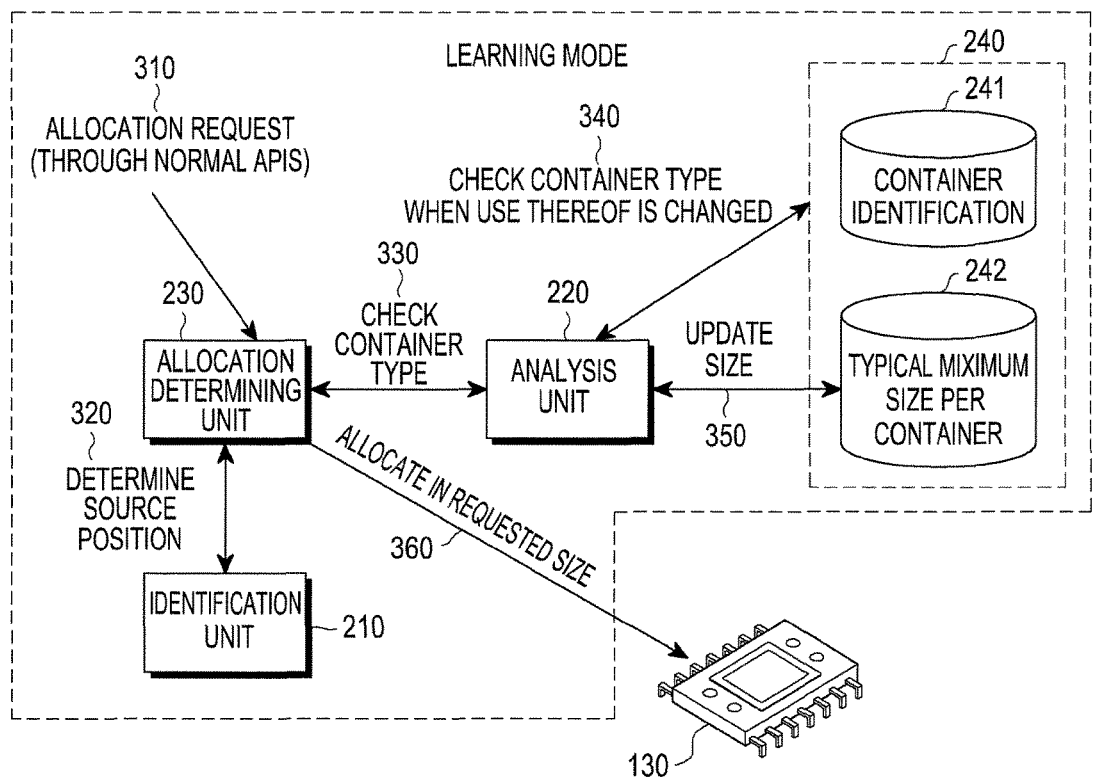
FIG. 3 is a flowchart illustrating an example of a method of allocating a memory, in a memory to which various embodiments of the present disclosure may be applied.

FIG. 3 is a flowchart illustrating an example of a method of allocating a memory, in a memory to which various embodiments of the present disclosure can be applied. Referring to FIG. 3, it is assumed that the memory 130 is allocated for the specific application as the learning mode.

The memory 130 includes all kinds of recording media in which programs and data readable by a computer system are stored. Examples of the recording media include a Read Only Memory (ROM), a Random Access Memory (RAM), a Compact Disk (CD), a Digital Video Disk (DVD)-ROM, a magnetic tape, a floppy disk, an optical data storage device, an Embedded MultiMedia Card (eMMC) and the like, and also include something implemented in a form of carrier wave (for example, transmission through Internet). Further, the recording media can store and execute codes distributed to a computer system connected through a network and readable by a computer in a distributed scheme.

In step 310, the allocation determining unit 230 can examine a history of the memory allocation requests for the application program identified through the identification unit 210. For example, when the allocation determining unit 230 receives the allocation request for the specific application, the allocation determining unit 230 can retrieve and examine the history of the application from the history storage unit 220.

In step 320, the analysis unit 220 can perform an operation of determining a location of a source. Here, the location of the source can be a location of a container allocated to the application.

In step 330, the analysis unit 220 can determine a type of the container according to whether the previous instances of the application are checked, as the result of the checking of the history of the application. When there is a record of the application program, the containers or a use of the memory linked to the application program, as the result of the analysis of the history, the analysis unit 220 can determine the learning mode as the allocation mode of the memory 130. Since the learning mode is determined, the request by the specific application program, an allocation method determined by the allocation determining unit 230, and the like can be traced. In addition, a code and the size of the allocation of the application program or details of a comparative position of a predetermined successfully linked re-allocation can be stored as a partial of the history.

For example, the analysis unit 220 can determine whether the container allocated in the corresponding memory is the container of the static type or the container of the non-static type. In addition, the analysis unit 220 can check which pool of the reserved memory allocates the container of the previously allocated memory, or which static container of allocation is caused by the container of the previously allocated memory, through a typical maximum size 242 per container stored in the history storage unit 240. In addition, the analysis unit 220 can determine whether the analyzed container is the static container having the fixed size.

As a result of the examination of the container type of the memory of which the allocation is determined by the analysis unit 220, when the container is classified as a container of which the type is different from that of a previous container, the analysis unit 220 can transfer a use change of the container type of the corresponding memory to the history storage unit 240, in step 340. In addition, the history storage unit 240 can store information on the container of which the use is changed in the container identification 241.

As a result of the checking of the container size of the memory of which the allocation is determined by the analysis unit 220, when the container size is different from that of the previous container, the analysis unit 220 can transfer the size of the specific container of the corresponding memory to the history storage unit 240, in step 350. Further, the history storage unit 240 can store the information on the size of the specific container as the typical maximum size 242 per container.

In step 360, the allocation determining unit 230 can control the memory 130 so that the memory 130 performs the memory allocation operation for the application requesting the memory allocation. For example, the allocation determining unit 230 can check whether there is a history of the corresponding application, in the case of the presence of the history, the allocation determining unit 230 can perform the memory allocation operation in consideration of at least one of the previous instances of the corresponding application and container information of the corresponding memory during a previous allocation of the corresponding application.

The analysis unit 220 can further determine whether requests for the re-allocation are checked in the previously allocated memory through the history storage unit 240, from a current or previous instance of the application. The analysis unit 220 can identify the container type of the previously allocated memory, through the container identification information 241 stored in the history storage unit 240.

The analysis unit 220 can determine the type of the containers requiring further re-allocation as the non-static type according to the performance of the application program. However, when the containers requiring the re-allocation are not dynamically increased, or the size or the frequency of the re-allocation is continuously smaller than the threshold, the type of the corresponding container can be checked as being static.

According to various embodiments, in order to decrease a fragmentation and the re-allocation, the analysis can be configured to disregard containers having a medium size or containers of which sizes are changed due to an overhead tracing a history of a corresponding container. Furthermore, the analysis unit 220 can check which containers are static or non-static, and determine which container should be disregarded when training is further complete and reaches a non-learning threshold first. Therefore, the history can be a container identification database, and a structure, a size and an operation of the container identification database can be selected so as to prevent a bottleneck in requesting and responding to inquiries in the non-learning mode.

For example, when the request for the re-allocation is identified, the analysis unit 220 can check a history related to the container type, the container size and information on a process of the container use. It is assumed that the analysis unit 220 determines that a specific container, which has been allocated as the static container, is processed to be allocated as the non-static based on a current operation. At this time, the corresponding container can be re-allocated to the memory 130 and the history can be stored so as to reflect a change of a state. Meanwhile, the analysis unit 220 may not allocate the container, which is converted from static to non-static, i.e., dynamic, any more from a shared pool, and determine its own presence.

When the analysis unit 220 determines that a certain container is sufficiently large, the analysis unit 220 can regard the corresponding container as non-static and the corresponding container can be flagged in the history. Therefore, when the application program is executed, the corresponding container can be allocated as the maximum size in a specific allocation method, regardless of the learning mode or the non-learning mode. The analysis unit 220 can identify a container initially classified as non-static ends indicating static characteristics, and can enable the application program to be allocated to the corresponding container first from a static pool, when the application program is executed again.

The process of determining when to change between the learning mode and the non-learning mode is performed according to predetermined criteria as described above. If an application program exits before the learning threshold has been reached all current information on allocation history is stored and the learning mode is adopted so that learning continues next time the application program is run. For a large application program it is envisaged that several instances will be used to gather information before a switch to the non-learning mode.

Figure 4:
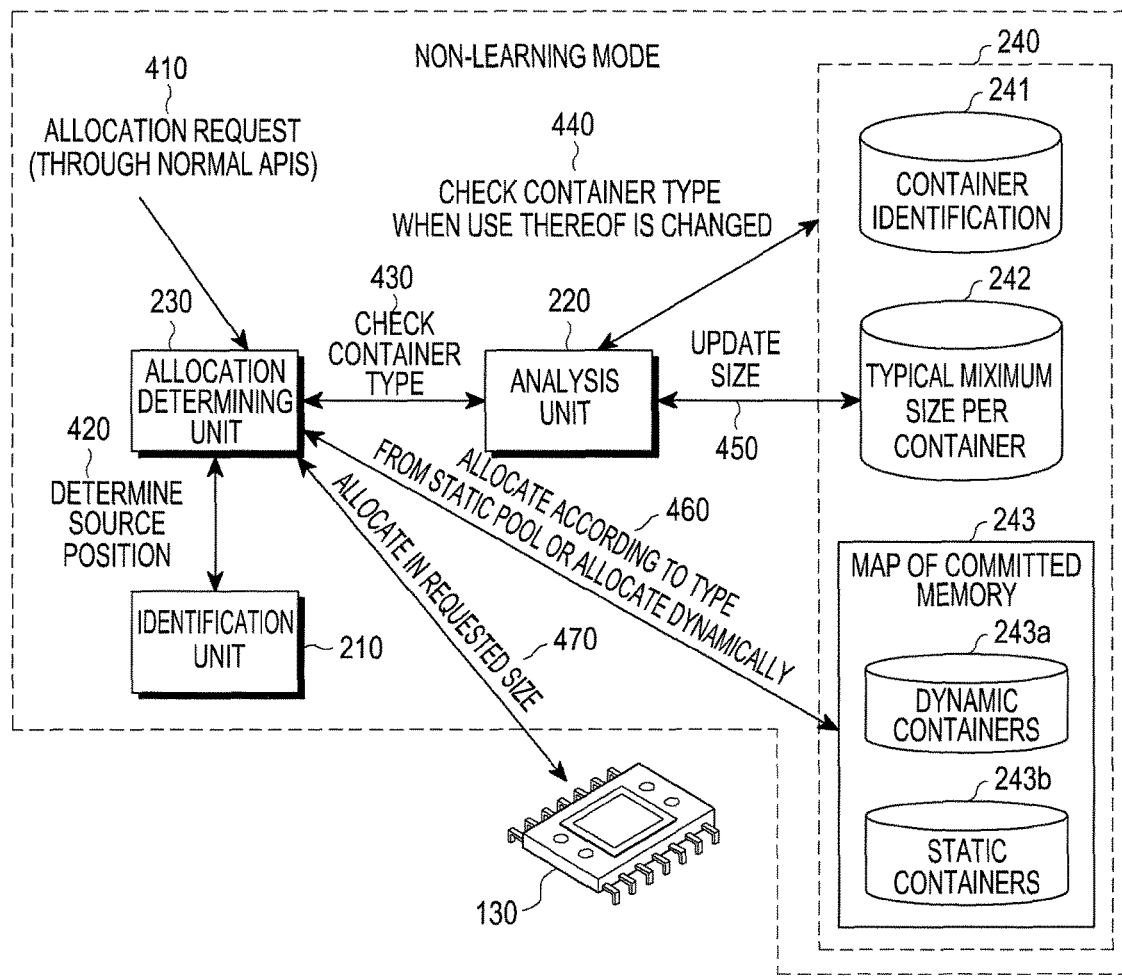
FIG. 4 is a flowchart illustrating another example of a method of allocating a memory, in a memory to which various embodiments of the present disclosure may be applied.

FIG. 4 is a flowchart illustrating another example of allocating a memory to which various embodiments of the present disclosure can be applied. Referring to FIG. 4, the memory 130 can be a Random Access Memory (RAM).

In step 410, the allocation determining unit 230 can check the memory allocation requests for the application program identified through the identification unit 210. For example, when the allocation determining unit 230 receives the allocation request for the specific application, the allocation determining unit 230 can examine the history of the application through the history storage unit 240.

In step 420, the analysis unit 220 can perform an operation of determining a location of a source. Here, the location of the source can be a location of a container allocated to the application.

In step 430, the analysis unit 220 can determine the type of the container allocated to the application in the memory 130. For example, the operation of determining the type of the container is similar to the operation described in step 330 of FIG. 3, and thus detailed descriptions are omitted.

As a result of the checking of the container type of the memory of which the allocation is determined by the analysis unit 220, when the container is classified as a container of which the type is different from that of a previous container, the analysis unit 220 can transfer a use change of the container type the corresponding memory to the history storage unit 240, in step 440. In addition, the history storage unit 240 can store information on the container of which the use is changed to in the container identification information 241.

When checking the container size of the memory of which the allocation is determined, reveals that the container size is different from that of the previous container, the analysis unit 220 may transfer the size of the specific container of the corresponding memory to the history storage unit 240, in step 450. Further, the history storage unit 240 can store the information on the size of the specific container as the typical maximum size 242 per container.

When the previous instances of the corresponding application are retrieved, the allocation determining unit 230 can examine a history wherein the re-allocation is performed in the memory previously allocated to the application. When the memory for the application is previously allocated, the history storage unit 240 can further include a map 243 of an inserted memory, as information on the memory allocated for the application. For example, the map 243 of the inserted memory can include information 243a on the dynamic containers allocated in the memory which is previously re-allocated to the application or information 243b on the static containers.

Since the allocation determining unit 230 checks the information in the dynamic containers 243a, the allocation determining unit 230 can check that the dynamic container from the pool of the reserved memory is previously allocated to the application requesting the memory allocation, in step 460. In addition, since the allocation determining unit 230 checks the information 243a on the dynamic containers, it can be determined whether the previously allocated dynamic container has the fixed size.

In step 470, the allocation determining unit 230 can allocate the memory 130 in the type or in the fixed size of the container identified in step 460, to the application requesting the memory allocation.

For example, when the allocation request is identified, the allocation determining unit 230 can access the history storage unit 240 to determine whether the container of which the allocation is requested is one of the non-static containers. Here, checking the non-static container can be identified based on a comparative location in a code of the corresponding allocation request. When the container, a subject of which the allocation is requested, is identified, the allocation determining unit 230 can allocate the corresponding container based on contents stored in the non-static container (e.g., the history storage unit 240). Here, the allocated container can be allocated immediately in an accurate size based on information during the operation of the memory allocating unit in the learning mode or related allocation information recorded as the history of the container.

The memory allocating unit 132 according to various embodiments can control to allocate the container as a one-off event. Therefore, costly follow-up re-allocations can be prevented. For example, when a specific allocation request is identified as the allocation related to the static container, the specific container can be allocated in a previously learned size from a static pool of the successive memory. Therefore, the fragmentation of the corresponding container can be reduced. According to various embodiments, the allocation determining unit 230 can request a final allocation. Here, the final allocation can be an allocation following a request in an operating system for a physical memory (e.g., RAM).

Figure 5:
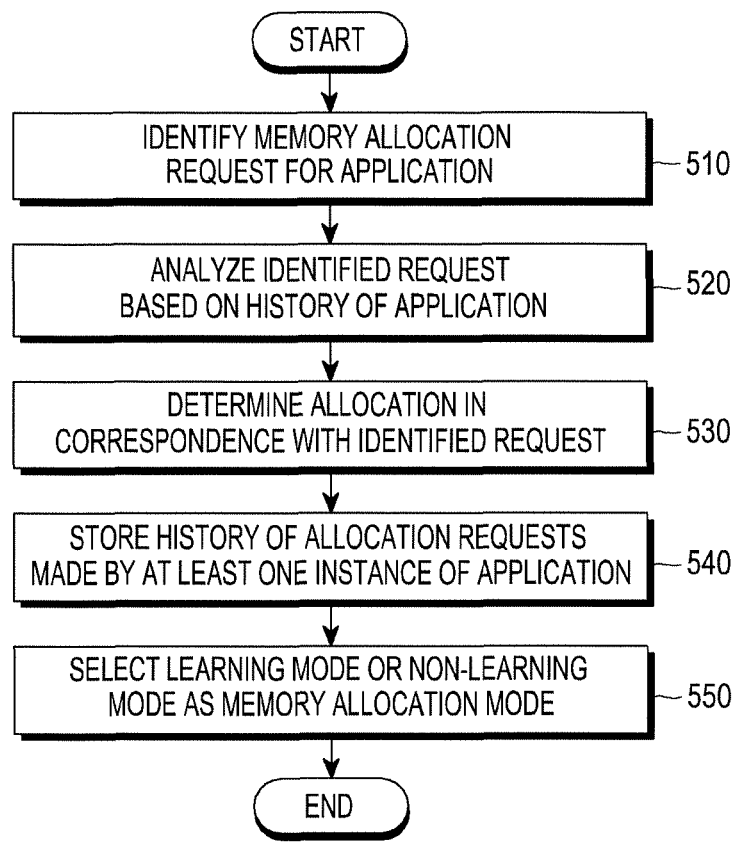
FIG. 5 is a flowchart illustrating an example of a method of allocating a memory according to an embodiment of the present disclosure.

FIG. 5 is a flowchart illustrating an example of a method of allocating a memory according to an embodiment of the present disclosure. Referring to FIG. 5, in step 510, the processor can control to identify the memory allocation request for the application.

In step 520, the processor can analyze the identified memory request, based on the history of the application requesting the memory allocation.

In step 530, the processor can control to perform the memory allocation operation for the application in response to the memory request.

After the memory allocation operation, the processor can control to store the memory allocation request of the specific application on which the memory allocation operation is performed, in step 540. For example, in step 540, the processor can control to store the instances of the application as the history of the memory allocation request by the application.

In step 550, the processor can control to select the learning mode or the non-learning mode as the memory allocation mode of the application, according to whether the previous instances of the application are checked.

Figure 6:
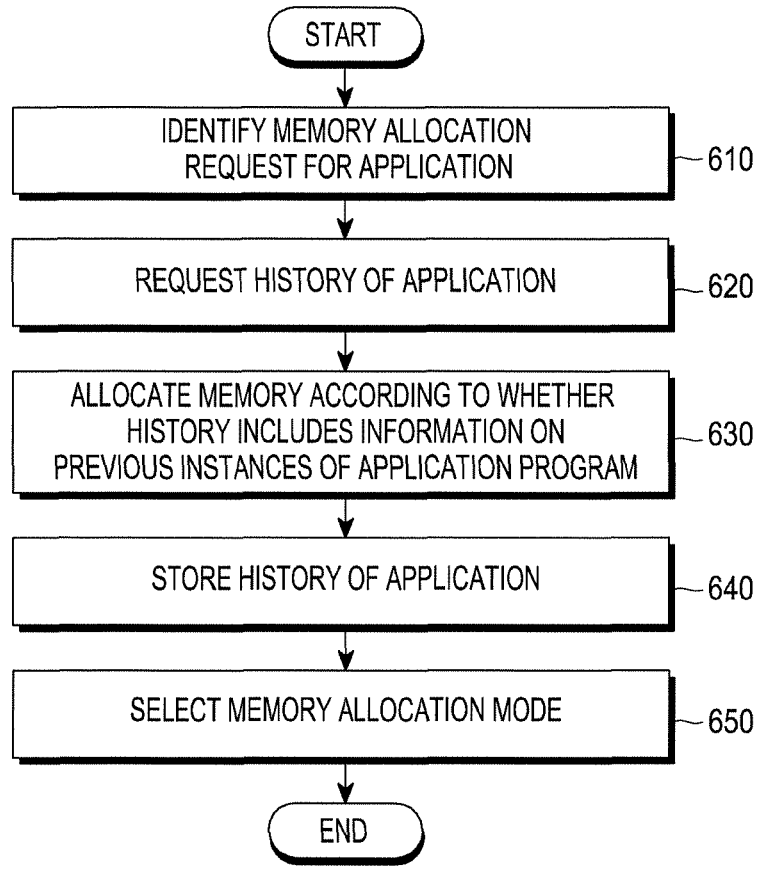
FIG. 6 is a flowchart illustrating another example of a method of allocating a memory according to an embodiment of the present disclosure.

FIG. 6 is a flowchart illustrating another example of allocating a memory according to an embodiment of the present disclosure. Referring to FIG. 6, in step 610, the processor can identify the memory allocation request for the application.

In step 620, the processor can control to request the history of the application requesting the memory allocation.

In step 630, the processor can control to operate the memory allocation operation according to whether the history of the application includes information on previous instances of the corresponding application.

In step 640, when the processor performs the memory allocation operation in the learning mode, the processor can control to store the information on the type or the size of the container determined according to the memory allocation operation as the history of the application. In addition, the processor can permanently store other instances of the application so as to control to use other instances when another memory of the corresponding application is allocated.

Next, in step 650, when the memory allocation request of the application is identified again, the processor can control to select the memory allocation mode of the application according to the stored history of the application.

FIGS. 7 to 10 are block diagrams illustrating various examples of configurations of an electronic device to which various embodiments of the present disclosure can be applied.

Figure 7:
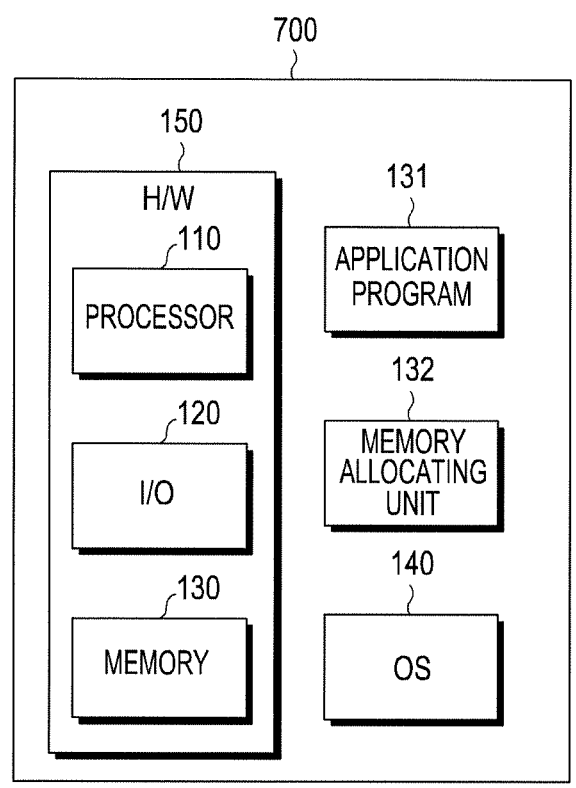
FIG. 7 is a block diagram illustrating an example configuration of an electronic device according to various embodiments of the present disclosure.

Referring to FIG. 7, an electronic device 700 to which various embodiments of the present disclosure can be applied can include a memory allocating unit 132, and can be implemented by any one among various schemes. For example, the electronic device 700 can include a hardware 150 including the processor 110, the memory 130 and the I/O 120, as described with reference to FIGS. 1 and 2. According to various embodiments of the present disclosure, the electronic device 700 can include the memory allocating unit 132 disposed between the application program 131 on a process hardware and the Operating System (OS) 140.

Figure 8:
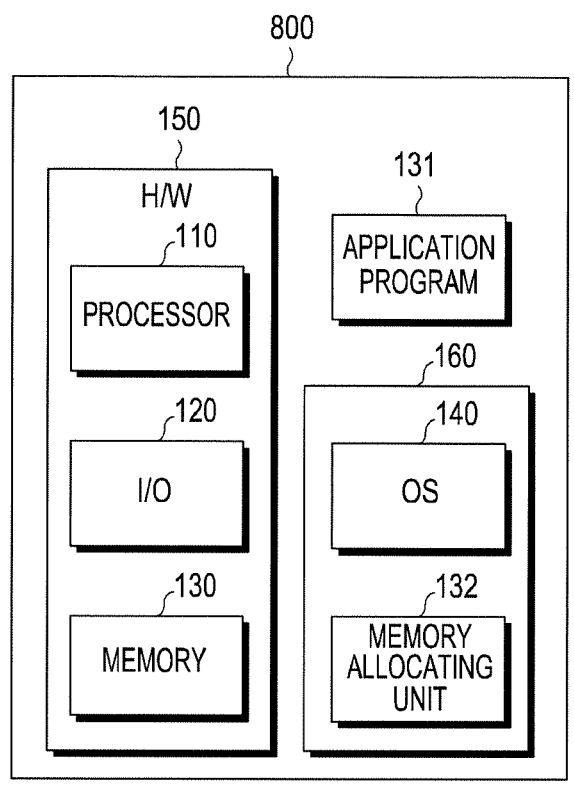
FIG. 8 is a block diagram illustrating an example configuration of an electronic device according to various embodiments of the present disclosure.

Referring to FIG. 8, the electronic device 800 can include the hardware 150 including the processor 110, the memory 130 and the I/O 120, as described with reference to FIGS. 1 and 2. According to various embodiments of the present disclosure, the electronic device 800 can include a block 160 including the OS 140 and the memory allocating unit 132.

Figure 9:
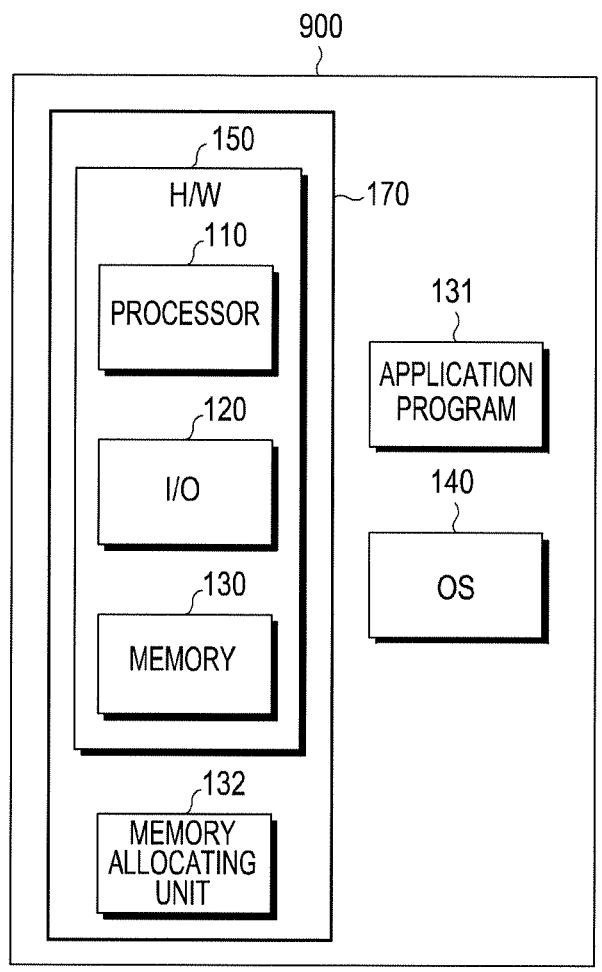
FIG. 9 is a block diagram illustrating an example configuration of an electronic device according to various embodiments of the present disclosure.

Referring to FIG. 9, the electronic device 900 can include the memory allocating unit 132 as a part of the above-mentioned hardware 170.

Figure 10:
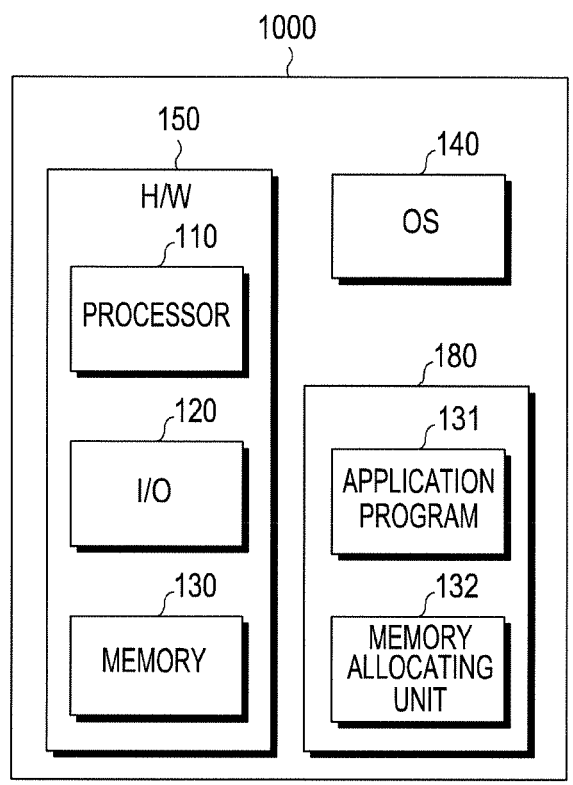
FIG. 10 is a block diagram illustrating an example configuration of an electronic device according to various embodiments of the present disclosure.

Referring to FIG. 10, an electronic device 1000 can include the hardware 150 including the processor 110, the I/O 120 and the memory 130, and the memory allocating unit 132. In such an alternative hardware implementation, the memory can include the memory allocating unit 132, for example, embedded into a part of the same package or an assembly thereof.

Referring to FIG. 10, the memory allocating unit 132 can be a part of the application program 131. When the memory allocations being requested by the application program 131 including the memory allocating unit 132 are identified, the memory can be allocated through the modified containers operated as described and a use of a drop-in replacement of general C/C++ library containers. In addition, the modified containers can provide features enabling the identification of the memory allocation requests and/or features for storing, tracing and analyzing the size and re-allocation history by tracing the size and re-allocation history.

Further, if the electronic device 1000 is a part of a platform that supports modifying application binaries or platform libraries, the application binaries or platform libraries that are normally used to request and perform memory allocations can be modified at runtime to flag the static and non-static containers directly in binary. This can introduce security problems, so is likely to be a suitable implementation on particular platforms. Also, according to various embodiments of the present disclosure, the application program 131 can be customized at build-time to provide the functionality of the memory allocating unit 132. Build-time customization can also be used so that improved mechanisms are provided for identifying requests for memory allocation, and for tracking meta data on such requests. These mechanisms can be used to facilitate identification of allocation requests and/or the analysis performed by the memory allocating unit 132. Build-time optimization can also enable some preliminary aspects of container identification can be done as an offline process, with applications tested using inputs from real users to enable a history of requests for allocation, and identification of containers as static and non-static to take place. Visualization tools to aid build-time optimization or to determine effectiveness of the memory allocator's allocation strategies are also envisaged. To reduce the impact of non-static containers during learning mode it is possible that during build-time some non-static containers are automatically tagged so that the memory allocator can easily determine a memory allocation to an optimum size at the first instance of the application being run.

Figure 11:
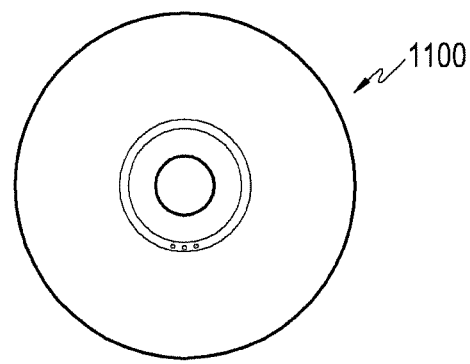
FIG. 11 is a view illustrating an example of a recording medium to which various embodiments of the present disclosure may be applied.

FIG. 11 is a view illustrating an example of a recording medium to which various embodiments of the present disclosure can be applied. The recording medium shown in FIG. 11 is for only illustration purpose. Other embodiments, such as magnetic medium card or an SRAM or flash RAM memory, or a network storage can be used.

Referring to FIG. 11, when the recording medium is implemented to include the electronic device according to various embodiments of the present disclosure, the recording medium can be a computer readable recording medium in which instructions for configuring the electronic device to which various embodiments of the present disclosure may be applied or for performing the method of allocating the memory by the electronic device according to various embodiments of the present disclosure are recorded.

The industrial applications of the various embodiments of the present disclosure will be clear from the discussion herein. No manual configuration is needed in use, as the memory allocating unit is arranged to automatically adjust itself. From the point of view of a developer, minimal manual configuration is needed enabling the developer to focus on the business logic or other aspects of the application program without having to spend time optimizing the memory allocation. Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The disclosure is not restricted to the details of the foregoing embodiment(s). The disclosure extends to any novel one, or any novel combination, of the features disclosed in this specification (including any accompanying claims, abstract and drawings), or to any novel one, or any novel combination, of the steps of any method or process so disclosed.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An electronic device comprising:
    a memory allocating unit configured to:
        identify a memory allocation request for an application,
        examine a history of memory allocation requests for the application, wherein the history of the memory allocation requests has been updated when allocating at least part of the memory to the application, and
        determine a memory allocation mode for the application, based on whether the history of memory allocation requests for the application meets a learning threshold; and
    a processor configured to perform a memory allocation operation according to the determined memory allocation mode,
    wherein the processor is configured to store information on a type or a size of a container determined according to the memory allocation mode as the history of memory allocation requests for the application, in response to performing the memory allocation operation in a learning mode.

2. The electronic device of claim 1, wherein the processor is configured to control the memory allocating unit to select a learning mode as the memory allocation mode, based on the result of the examination, and a memory for the application is allocated according to the result of the examination.

3. The electronic device of claim 2, wherein the processor is configured to control the memory allocating unit to set the memory allocation mode as a non-learning mode, when the history for the application meets the learning threshold that includes at least one of a number of memory allocation request during a predetermined time, a number of previous instance of the application, and an elapsed time after a first inquiry requesting a history of the memory allocation request.

4. The electronic device of claim 3, wherein the processor is configured to control the memory allocating unit to set the memory allocation mode from the non-learning mode to the learning mode, when the application meets a re-learning threshold that includes at least one of the number of a memory re-allocation request during a predetermined time and a size value of a combination of a re-allocated memory.

5. The electronic device of claim 4, wherein the processor is configured to control the memory allocating unit to determine whether the memory allocation request of the application requests a fixed size of allocation from a pool of a memory reserved in advance, when a previously allocated memory is a static type container, from current or previous instances of the application.

6. The electronic device of claim 5, further comprising:
    a logger, wherein the processor is configured to control the logger to store the history for the memory allocation request performed by a plurality of instances of the application during an operation of the learning mode.

7. The electronic device of claim 6, wherein the processor is configured to control the logger to manage a container identification database to store at least one of a log of containers allocated in response to the identified memory allocation requests, link information of a container linked according to the identified memory allocation request, a history for a re-allocation for a container of which the size is changed, data of the history for the re-allocation, information on the size of allocated containers, and information on whether static containers are allocated from a pool of a reserved memory so as to have a fixed size.

8. A method of allocating a memory in an electronic device, the method comprising:
    identifying a memory allocation request for an application;
    examining a history of memory allocation requests for the application, wherein the history of the memory allocation requests has been updated when allocating at least part of the memory to the application;
    determining a memory allocation mode for the application, based on whether the history of memory allocation requests for the application meets a learning threshold;
    performing a memory allocation according to the determined memory allocation mode; and
    storing information on a type or a size of a container determined according to the memory allocation mode as the history of memory allocation requests for the application, in response to performing the memory allocation operation in a learning mode.

9. The method of claim 8, further comprising:
    selecting a learning mode as the memory allocation mode, when the history for the application is checked; and
    allocating a memory for the application according to the checked history for the application, as the learning mode is selected.

10. The method of claim 9, further comprising:
    setting the memory allocation mode as a non-learning mode, when the history for the application meets the learning threshold that includes at least one of the number of memory allocation request during a predetermined time, the number of previous instance of the application, and an elapsed time after a first inquiry requesting a history of the memory allocation request.

11. The method of claim 10, further comprising:
    setting the memory allocation mode from the non-learning mode to the learning mode, when the application meets a re-learning threshold that includes at least one of the number of a memory re-allocation request during a predetermined time and a size value of a combination of a re-allocated memory.

12. The method of claim 11, further comprising:
checking whether the memory allocation request of the application requests a fixed size of allocation from a pool of a memory reserved in advance, when a previously allocated memory is a static type container, from current or previous instances of the application.

13. The method of claim 11, further comprising:
storing the history for the memory allocation request performed by a plurality of instances of the application during an operation of the learning mode.

14. The method of claim 13, further comprising:
managing a container identification database to store at least one of a log of containers allocated in response to the identified memory allocation requests, link information of a container linked according to the identified memory allocation request, a history for a re-allocation for a container of which the size is changed, data of the history for the re-allocation, information on the size of allocated containers, and information on whether static containers are allocated from a pool of a reserved memory so as to have a fixed size.

15. An electronic device comprising:
a memory configured to store memory allocation requests for each application;
a processor configured to:
receive and identify a memory allocation request for an application;
examine a history of the memory allocation requests for the application, wherein the history of the memory allocation requests has been updated when allocating at least part of the memory to the application;
determine a memory allocation mode for the application, based on whether the history of memory allocation requests for the application meets a learning threshold; and
perform a memory allocation operation according to the determined memory allocation mode,
wherein the processor is configured to store information on a type or a size of a container determined according to the memory allocation mode as the history of memory allocation requests for the application, in response to performing the memory allocation operation in a learning mode.

16. The electronic device of claim 15, wherein the processor is configured to select a learning mode as the memory allocation mode, based on the result of the examination.

17. The electronic device of claim 16, wherein the processor is configured to shift the memory allocation mode as a non-learning mode, when the history meets the learning threshold that includes at least one of a number of memory allocation request during a predetermined time, a number of previous instance of the application, and an elapsed time after a first inquiry requesting a history of the memory allocation request.

18. The electronic device of claim 17, wherein the processor is configured to shift the memory allocation mode from the non-learning mode to the learning mode, when the history meets a re-learning threshold that includes at least one of the number of a memory re-allocation request during a predetermined time and a size value of a combination of a re-allocated memory.

19. The electronic device of claim 18, wherein the processor is configured to determine whether the memory allocation request of the application requests a fixed size of allocation from a pool of a memory reserved in advance, when a previously allocated memory is a static type container, from current or previous instances of the application.

20. The electronic device of claim 19, wherein the processor is configured to record the history for the memory allocation request performed by a plurality of instances of the application during an operation of the learning mode in the memory.

* * * * *